United States Patent [19]

Baumgart et al.

[11] Patent Number: 5,981,903
[45] Date of Patent: Nov. 9, 1999

[54] LASER SYSTEM FOR SIMULTANEOUS TEXTURING OF TWO SIDES OF A SUBSTRATE

[75] Inventors: Peter Michael Baumgart, San Jose; James Hammond Brannon, Palo Alto; Chie Ching Poon, San Jose; Iraj Kakesh Pour, Milpitas; Andrew Ching Tam, San Jose, all of Calif.

[73] Assignee: International Business Machines Corporation, Armonk, N.Y.

[21] Appl. No.: 08/825,307

[22] Filed: Mar. 28, 1997

[51] Int. Cl.$^6$ .............................. B23K 26/00; G02F 1/33
[52] U.S. Cl. ................... 219/121.77; 219/121.68; 359/305; 360/135
[58] Field of Search ..................... 359/305, 311; 219/121.77, 121.73, 121.68, 121.69; 427/554, 555, 556; 264/400; 360/135

[56] References Cited

U.S. PATENT DOCUMENTS

| | | |
|---|---|---|
| 3,609,009 | 9/1971 | Lohman et al. |
| 3,989,778 | 11/1976 | Osborne. |
| 4,224,096 | 9/1980 | Osborne. |
| 4,321,564 | 3/1982 | Tregay ........................... 332/7.51 |
| 4,371,964 | 2/1983 | Podmaniczky et al. ............. 359/311 |
| 4,470,661 | 9/1984 | Matsumoto. |
| 4,549,789 | 10/1985 | Horiuchi et al. |
| 4,912,487 | 3/1990 | Porter et al. ..................... 346/108 |
| 5,062,021 | 10/1991 | Ranjan et al. .................... 360/135 |
| 5,077,748 | 12/1991 | Kozlovsky et al. ................. 372/22 |
| 5,108,781 | 4/1992 | Ranjan et al. .................... 427/53.1 |
| 5,132,834 | 7/1992 | Shinada ........................ 359/305 |
| 5,138,482 | 8/1992 | Hatori et al. ................... 359/305 |
| 5,283,773 | 2/1994 | Thomas et al. .................. 360/135 |
| 5,482,497 | 1/1996 | Gonnella et al. ................. 451/57 |
| 5,508,119 | 4/1996 | Sheu et al. .................... 428/687 |
| 5,526,109 | 6/1996 | Johnson ....................... 356/28.5 |
| 5,658,475 | 8/1997 | Barenboim et al. .............. 219/121.77 |
| 5,768,076 | 6/1998 | Baumgart et al. ................. 360/135 |
| 5,783,797 | 7/1998 | Xuan et al. .................... 219/121.69 |
| 5,790,433 | 8/1998 | Barenboim et al. ................ 360/135 |
| 5,822,211 | 10/1998 | Barenboim et al. .............. 219/121.77 |

FOREIGN PATENT DOCUMENTS

| | | |
|---|---|---|
| 0652554 A1 | 5/1995 | European Pat. Off. . |
| 60-107617 | 6/1985 | Japan . |
| 1-216316 | 2/1988 | Japan . |
| 4-83388 | 7/1990 | Japan . |
| 7-65359 | 8/1993 | Japan . |
| 08194197 | 7/1996 | Japan . |

OTHER PUBLICATIONS

Anonymous, "Texturing A Magnetic Tape Surface", Research Disclosure, Feb. 1987, No. 274, p. 27470.

J. Lekavich, "Basics of Acousto–Optic Devices", Lasers & Applications, Apr. 1986, pp. 59–64.

*Primary Examiner*—Geoffrey S. Evans
*Attorney, Agent, or Firm*—G. Marlin Knight

[57] ABSTRACT

A laser system is described which concurrently directs highly equivalent diffracted beams derived from an initial laser beam to both sides of a substrate. The diffracted beams may be generated with sufficient energy to soften spots on the surfaces of the substrate to form texture bumps as are used on substrates for magnetic disks. The diffracted beams are generated by a multichannel acousto-optic modulator (MCAOM) having at least two channels. The crystal in the MCAOM has at least two mounting faces oriented so that the acoustic transducers mounted thereon generate acoustic fields which intersect the incident laser beam at a common angle, i.e., the Bragg angle. Energizing any of the transducers causes a corresponding first order beam to be diffracted out. Preferably the diffracted beams are generated by alternating driving signals to transducers to produce two beams with pulse intensity greater than 50% of that of the incident beam which can be directed to opposite sides of a substrate for extremely uniform texturing.

20 Claims, 9 Drawing Sheets

LASER SYSTEM FOR SIMULTANEOUS TEXTURING OF TWO SIDES OF A SUBSTRATE

RELATED APPLICATION

This application is related to commonly assigned and concurrently filed application entitled "Multiple Channel Acousto-Optic Modulators" Ser. No. 08,825,305. It is also related to a commonly assigned application which was filed on Feb. 6, 1997 entitled "Method and Tool for Laser Texturing of Glass Disks" for which a ser. No. 08/795,627

FIELD OF THE INVENTION

The invention relates to the field of laser systems and more particularly to systems for texturing disks for use in disk drives.

BACKGROUND

The magnetic surfaces of the disks used for data storage must be extremely smooth with peak-to-valley roughness of some thin film disks being less than 100 Angstroms. The design of most disk drives allows the sliders to rest on the disk surface when the disk is not spinning. If the sliders were allowed to rest on a very smooth surface, the result would be unacceptably high stiction forces between the disk surface and the sliders. To reduce the stiction forces between sliders and smooth disks, a band on the disk surface may be deliberately roughened by, for example, laser texturing to form a contact start/stop (CSS) region.

Laser texturing of a CSS is described by Ranjan, et al., in J. Appl. Phys. 4–91, p.5746ff. The average surface roughness (Ra) was varied by altering the beam current. U.S. Pat. No. 5,528,922 describes the use of increased number of laser pulses to increase the height of a peripheral ridge in crater shaped bumps. U.S. Pat. No. 5,062,021 describes the use of laser created bumps to form a CSS region, controlling depth and height of the bumps by varying the laser power and pulse duration, and altering the shape of the bumps by varying the laser beam inclination relative to the disk surface.

A typical CSS region contains a generally spiral pattern formed from tens of thousands of bumps in a 3 mm wide annular region. Using prior art techniques laser bumps can be produced in various shapes including sombrero-like bumps, ring-shaped or dome-shaped bumps. Dome-shaped bumps are preferred for glass disks. The diameter of the bumps is typically 5 to 30 microns with spacing of 10 to 100 microns and a height on the order of a few tens of nanometers.

The laser texturing of disks takes place prior to deposition of the thin film coatings, but may follow certain preparatory steps. For example, typically AlMg substrates are electrolessly plated with NiP and polished as an initial step. Other substrates such as glass are not plated, but may require polishing. The prepared substrate is laser textured and sputtered with the appropriate layers and progressively assembled into a functional disk drive using conventional techniques.

Since both sides of a disk normally need to be textured, there is an advantage to a system which can texture the two sides simultaneously to cut the processing time more than in half, as well as to reduce disk-handling steps and associated risks of damage. Since the two sides must be extremely uniform it is required that the beams on each side be essentially identical. Beam splitting is one way to get similar beams from a single source. Acousto-optic modulators (AOMs) are often used to split and/or modulate a laser beam. The basic principle of AOMs is that a transparent medium subject to a stress undergoes a change in the index of refraction. When the stress is associated with a high frequency sound wave, such as might be produced by a piezoelectric transducer, the change in refraction is periodic. The periodic refraction pattern can act as a diffraction grating producing what is called Bragg diffraction. The undiffracted beam is called the zeroth order beam and the primary diffracted beam is called the first order beam. The amount of light diffracted in an AOM is a function of the acoustic power being applied and can, therefore, be modulated by varying the applied power. Generation of a second modulated beam using prior art techniques requires a second AOM in series with the first. The second modulated beam created this way may vary significantly from the first in intensity or size and may contain an admixture of the other modulated beam.

SUMMARY OF THE INVENTION

A laser system is described which concurrently directs diffracted portions of a laser beam to both sides of a substrate. The diffracted beams may be generated with sufficient energy to soften spots on the surfaces of the substrate to form texture bumps as are used on substrates for magnetic disks. The diffracted beams are generated by a multichannel acousto-optic modulator (MCAOM) having at least two channels. The crystal in the MCAOM has at least two mounting faces oriented so that the acoustic transducers mounted thereon generate acoustic fields which intersect the incident laser beam at a common angle, i.e., the Bragg angle. Energizing any of the transducers causes a corresponding first order beam to be diffracted out. Preferably the diffracted beams are generated by alternating driving signals to transducers to produce two beams with pulse intensity greater than 50% of that of the incident beam which can be directed to opposite sides of a substrate for extremely uniform texturing. In a preferred embodiment a single incident beam is alternated between the two channels of a dual or two channel AOM (DCAOM) so that each beam has a maximum energy level. The use of the DCAOM solves the prior art problem of tandem AOMs that induces an admixture of beam modulations. The system uses shutters and electronic means for controlling the driving signals to the transducers of the DCAOM to control each channel as required. Amplitude and frequency modulation of the driving signals is optional to allow the intensity and angle of the beams to be controlled.

The mounting faces of an MCAOM crystal are oriented so that energizing any of the transducers causes a corresponding first order beam to be diffracted out. Since the acoustic field for each transducer intersects the incident beam with a unique orientation, each first order beam is diffracted out on a unique axis.

DETAILED DESCRIPTION OF THE INVENTION

Figure 1:
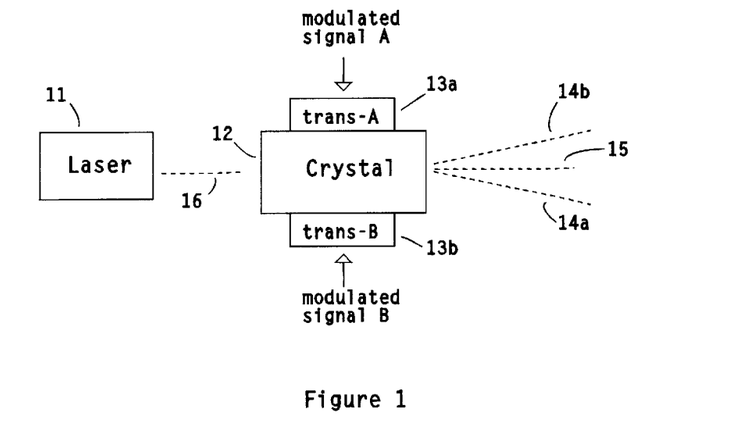
FIG. 1 is a block diagram of a system using a two channel AOM according to the invention.

A laser system according to the invention symmetrically and simultaneously textures both sides of a such as a magnetic disk substrate. The system could easily be adapted to other applications where two or more beams are needed. Reference is made to FIG. 1 for the following. A laser 11 generates a single incident beam 16 which falls on the DCAOM 12. Two pulsed beams are serially chopped out of incident beam 16, by alternately driving the first and second acoustic transducers 13a, 13b on the DCAOM to generate corresponding first order diffraction beams A1 14a and B1 14b. The driving signals, beam path lengths and the active optics are identical for both beams to produce equal texturing on both sides of the substrate. The laser may be of any type, pulsed or continuous. Crystal 12 has transducers 13a, 13b mounted on opposing faces for producing acoustic waves from electrical signals. The transducers are typically piezoelectric devices which are attached to the crystal by adhesive or mechanical means. Each transducer is controlled by it own modulation signal designated as A and B. Both amplitude and frequency modulation of electrical signals driving the transducers are possible using standard techniques, but the texturing system only requires that the incident beam be time sliced. A single zeroth order beam 15 emerges from the crystal. When neither transducer is activated the zeroth order beam 15 is the same as the incident beam. Activating transducer 13a causes a portion of the incident beam to be diffracted into beam 14a which is a first order beam which will called the A1 beam. Likewise activating transducer 13b causes a portion of the incident beam to be diffracted into the B1 beam 14b which is also a first order beam. The zeroth order beam or residual beam will always exist at some level of amplitude even when the maximum amount of diffraction, typically 80–90%, is achieved.

Figure 9:
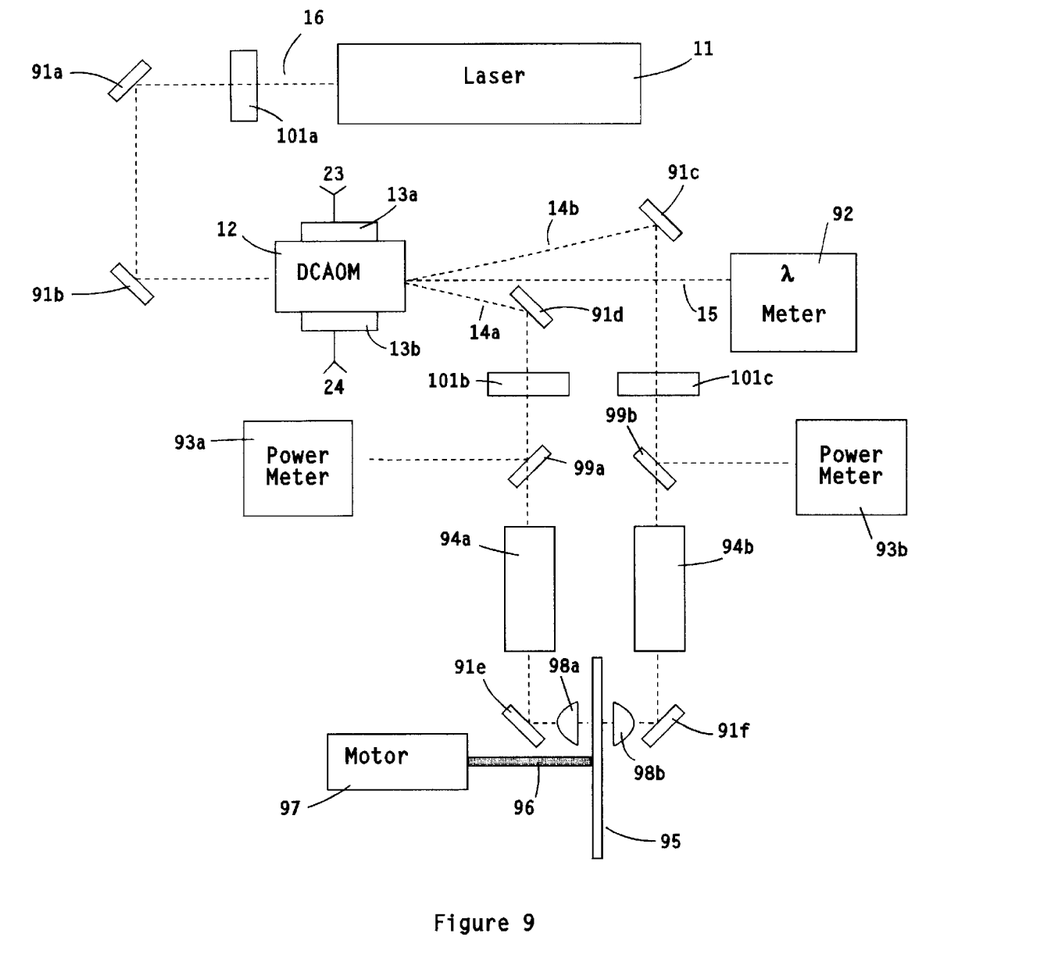
FIG. 9 illustrates a system using a DCAOM in a disk texturing apparatus.
Figure 10:
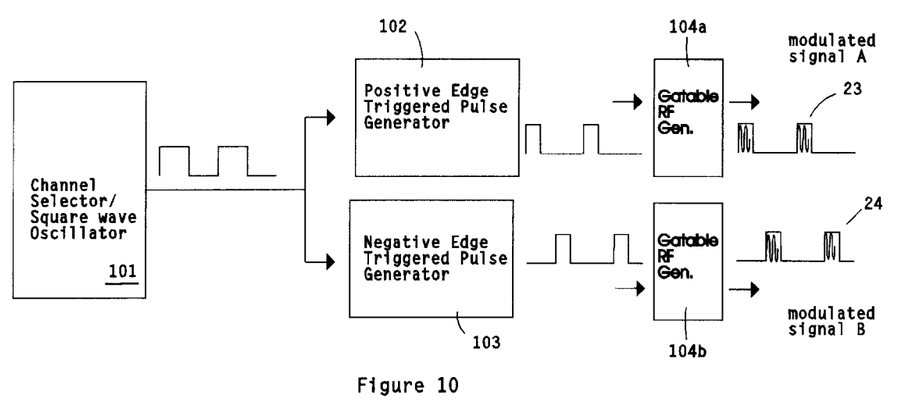
FIG. 10 illustrates one possible control means for the driving signals for the transducers of a DCAOM.

FIG. 10 illustrates one possible control means for the driving signals for the transducers of a DCAOM which can be used with the system illustrated in FIG. 9. The embodiment described uses a master 20 kHz square-wave oscillator 101 of 50—50 duty cycle to drive positive and negative edge triggered pulse generators 102, 103 which drive gatable RF generators 104a, 104b to form the envelopes of the modulated signals 23, 24. The oscillator 101 serves the function of the channel selector. Beams A1 and B1 are controlled by the two pulse trains thus generated from the rising and falling edges of the oscillator. Preferably the pulse widths are less than half of the master oscillator's period so that there is no overlap. Assuming a 20 kHz rep rate for the oscillator, this means that the pulse width for texturing the substrate typically is less than ten microseconds. Both the amplitude and the width of the pulses are used to control the intensity and pulse length of the first order laser beams.

To texture a band on each side of the rotating substrate, two alternative techniques are possible. The two laser beams can be moved across the substrate. One way to do this uses a Galvo mirror pair and an imaging lens with sufficient clear aperture to telecentrically scan each of the two focused laser spots on their respective sides of the stationary substrate to form the matrix of bumps for texturing. One bump is generated per laser pulse by localized softening and resolidification. The simultaneous nature of the two pulse trains and the equalization of the propagation distance results in texturing of both sides of the substrate. Alternatively the substrate can be placed on a rotation/translation stage to move the disk, while leaving the two beams fixed.

FIG. 9 illustrates a laser system using a DCAOM for texturing disk substrates for use as magnetic disks in disk drives. The system illustrated uses a DCAOM to form two essentially identical pulsed laser beams. The choice of laser is determined by the absorption characteristics of the substrate material, since the substrate must absorb enough energy for the softening to occur. For glass substrates which are transparent to visible light, this embodiment of the invention uses a temperature-stabilized 9.25 micrometers wavelength carbon dioxide laser 11. For other substrate materials such as AlMg, ceramics, etc. other wavelengths might be preferable. The laser 11 has a range of 1–50 Watts, and operates in this embodiment at approximately ten watts. Laser 11 generates a beam 16 which is routed through shutter 101a. Steering mirrors 91a, 91b direct the beam to the germanium crystal DCAOM 12 which has 40 MHz piezo-electric transducers 13a, 13b driven by signals 23, 24 which are alternately pulsed to generate alternately pulsed A1 and B1 beams 14a, 14b. The driving signals 23, 24 are selected to generate the maximum amplitude in beams 14a and 14b which as indicated should be about 80–90% of the incident beam. The zeroth order beam 15 is allowed to strike a wavelength meter 92. The A1 and B1 beams are routed to opposite sides of the disk being textured 95 through steering mirrors 91c, 91d, 91e, 91f, through beam expanders 94a, 94b and through focusing lenses 98a, 98b. A small portion of each beam is reflected by beam splitters 99a, 99b to power meters 93a, 93b. The zinc selenide beam splitters are approximately 90% reflective for a 9.25 micrometer wavelength beam. The disk is rotated by spindle 96 attached to motor 97 while the beams are pulsed to allow the beams to texture a circular or spiral pattern on each side of the disk. The motor, spindle and disk should be mounted on a translation stage (not shown) to allow a band of texture approximately 3 mm wide to be formed on the disk.

The described embodiment of the laser texturing system uses a DCAOM which can be any of the shapes which are described below. The transducers can be mounted on opposite or adjacent mounting faces of the crystals as described.

Since conventional AOMs are designed to operate with essentially single wavelength light, the material for the crystals are selected based on the wavelength. Materials are known which are suitable for use over the wavelength span from 0.2 to over 20 microns. Selection of the material for the MCAOMs of the invention is made according to these known principles. This implies that MCAOMs may be constructed for any wavelength for which crystals can be found for AOMs. The number of channels for which an MCAOM can be designed is limited only by the requirements of the geometry of the acoustic fields in the crystal as will be shown.

Although it is possible and desirable for some applications to operate an MCAOM with more than one transducer being driven at a time, the energy in the resulting beams will necessarily be reduced from the maximum possible from the incident beam, since diffracted beams are fractional portions of the incident beam. If only one transducer is allowed to be activated at a time, the diffracted beam can be driven to its maximum level which is preferable in the disk texturing system. When operated in this mode an MCAOM can produce a set of pulsed first order beams which are maximally similar and have 80–90% of the intensity of the incident beam and are thus superior for some applications to a set of beams produced by prior art techniques. Note also that the beam size for each first order beam can be made essentially identical, since the path for each beam is extremely similar. It should also be noted that although prior art AOMs have two output beams, i.e., a zeroth order beam and 1st order beam, which have similar paths and beam sizes, they are not well matched in amplitude due to fact that 100% diffraction is not possible.

In a prior art tandem AOM arrangement to produce two similar beams there are two possible configurations. It is possible to take the first order beam from AOM-1 as beam A, then direct the zeroth beam to AOM-2 to generate the second first order beam as beam B. Beams A and B clearly have very different paths and are therefore, subject to differences in amplitude and beam size making it difficult to achieve highly similar beams using this arrangement. It is also possible to use zeroth and first order beams from AOM-2 as beams A and B by routing the AOM-1 first order beam to AOM-2. In this configuration the problem of different paths does not occur, since both beams have passed through AOM-1 and AOM-2. However, the longer path length through two AOMs rather than one inherently leads to increased beam size due to divergence. Also since it is not possible to diffract 100% of the beam, the zeroth beam from AOM-2 inherently contains the undiffracted portion of the input beam which can be on the order of 10–20%. This leakage makes it impossible to bring the zeroth beam to zero amplitude when there is an input beam to AOM-2. A DCAOM solves this problem by generating two modulated and spatially separate beams from a single incident beam as will be seen.

Figure 2:
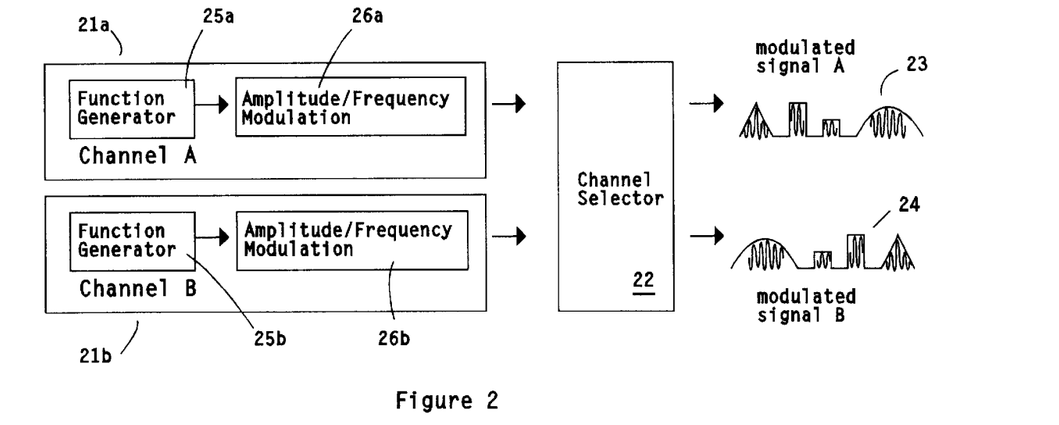
FIG. 2 illustrates the control functions for a two channel AOM according to the invention.

FIG. 2 illustrates the electronic control functions for an embodiment of a two channel AOM, in which the transducers are driven independently, which includes the ability to drive them alternately. The arbitrary modulated signals A and B are generated by separate channels A and B $21a$, $21b$ comprising a function generators $25a$, $25b$ and means to modulate the amplitude and/or the frequency of the signals $26a$, $26b$. The function generator could be a standard RF signal generator. The amplitude and frequency of the modulated signals A and B need not be equal and use of separate modulation control means for each channel allows the amplitudes and frequencies to be set independently. This feature allows a maximum flexibility for a wide range of applications. Channel selector 22 in this embodiment is used to select (enable) A and/or B or to disable both. The channel selector is not required to allocate equal time slices to each channel. For example, Channel A could be selected indefinitely without activating Channel B and vice versa. If equal amplitudes/frequencies and equal time slices are used, then maximum equivalence between the A1 and B1 beams will be achieved as a special case. Approximately 80–90% maximum transfer of the incident beam to the selected first order diffracted beam can be expected when only one transducer is being driven.

The wavelength of the laser and frequency of the piezo-transducers must be appropriately matched along with the crystal material. For example, a $CO_2$ laser of 9.25 microns wavelength can be used with a 40 MHz transducer in conjunction with a germanium crystal. As indicated, any material suitable for AOMs can be used for MCAOMs. These include quartz and lithium niobate.

The rate at which a beam can be modulated is related to the risetime of a modulated pulse and is determined by the ratio of the incident beam diameter to the velocity of sound in the crystal. Therefore, a smaller beam size permits a faster risetime and modulation rate. Since the zeroth order beam is inherently the portion of the incident beam not diffracted, it is also possible to control the application of the driving signals to result in modulation of the zeroth order beam if desired. From the earlier discussion it is clear that the zeroth beam can be modulated, but not reduced to zero as long as there is an incident beam. The incident beam can, of course, be controlled independently through the use of shutters, etc.

Figure 3:
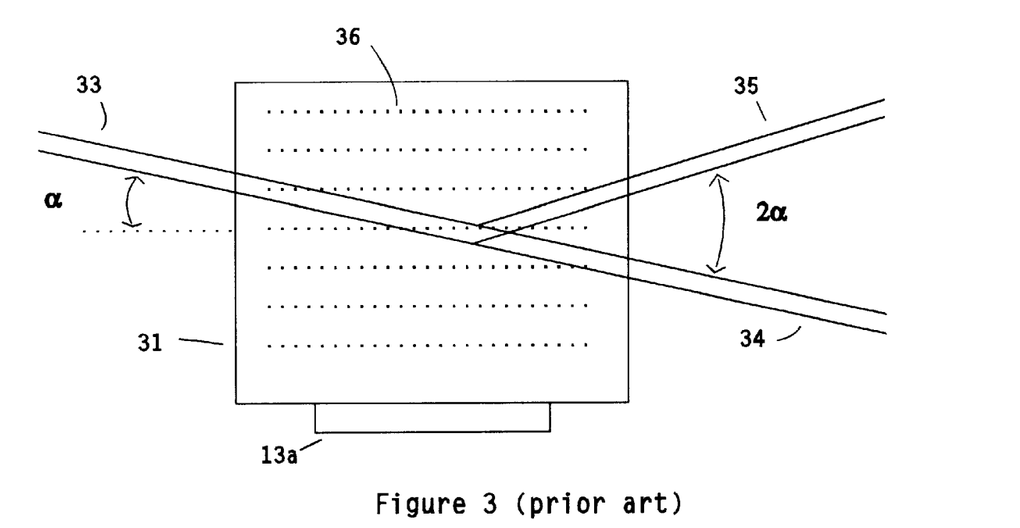
FIG. 3 illustrates a prior art crystal for use in an AOM.

In order to illustrate the angular relationships between the sound fields and the incident beam FIG. 3 which illustrates a prior art AOM will be used. Crystal 31 is typically rectilinear, but the face of the crystal opposite to the transducer $13a$ may be obliquely angled to dampen acoustic reflections. The incident beam 33 enters the crystal at an angle alpha to intersect the acoustic field (represented by the dotted lines 36) at the angle alpha. The angle of diffraction of the first order beam 35 is then twice alpha.

The required angle alpha for the intersection of the acoustic field and the incident beam is called the Bragg angle which is given by $$\alpha = \frac{1}{2} * \frac{\lambda}{\Lambda}$$

where $\Lambda$ is the acoustic wavelength and $\lambda$ is the optical wavelength. The acoustic wavelength is determined by the ratio of the velocity of sound in the crystal to the frequency:

$$\Lambda = v/f$$

An example of a calculation of a Bragg angle for a $CO_2$ laser $\lambda = 9.2$ microns, a germanium crystal and a 40 MHZ transducer is as follows. The velocity of sound of $5.5*10^5$ cm/sec for germanium is available from tables. Thus, $$\Lambda = \frac{5.5*10^5}{40*10^6} = 1.38*10^{-2} \text{ cm}$$

and the Bragg angle alpha is:

$$\alpha = \frac{1}{2} * \frac{9.2*10^{-4} \text{ cm}}{1.38*10^{-2} \text{ cm}} = 33 \text{ milliradians} \cong 2 \text{ degree}$$

Since the diffracted beam typically needs to be physically separated from the zeroth beam by mirrors to be used conveniently, the angle should not be too small. Likewise too large of an angle would also present physical problems for the mirror arrangement. Therefore, it is suggested that the Bragg angle be between 1 and 20 degrees for convenience, although larger and smaller angles are possible.

Figure 4A:
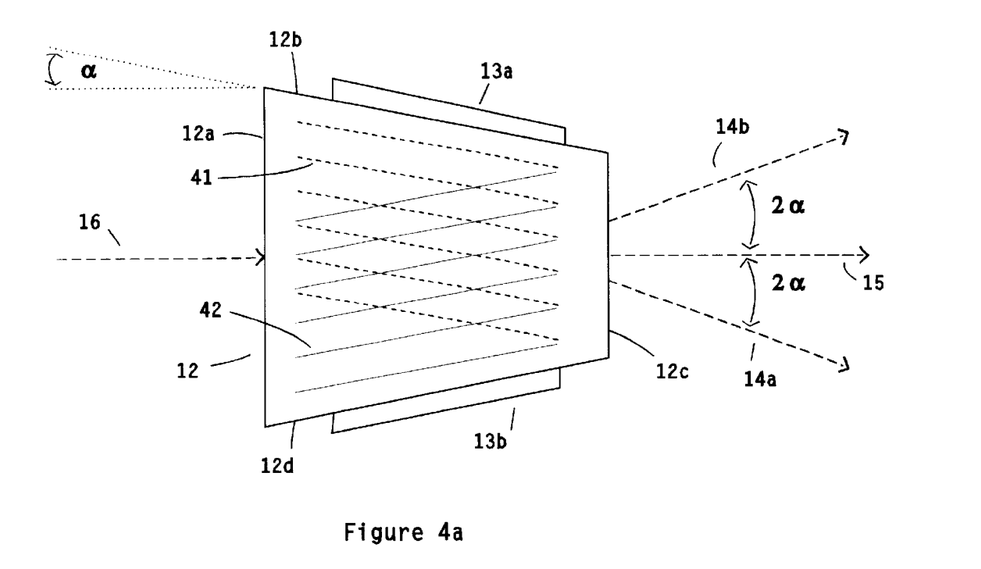
FIGS. 4a–b illustrate a two channel AOM assembly according to the invention.
Figure 4B:
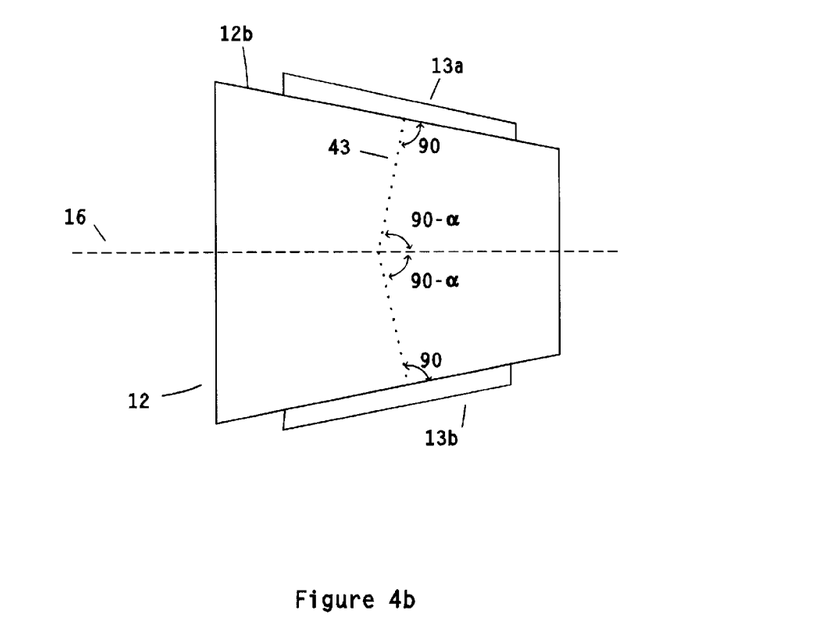

The geometry of a crystal for use in an MCAOM is constrained by the requirement that the angle of intersection between the light and the acoustic field be the same regardless of which transducer is being driven. The faces of the crystal on which the transducers are to be mounted are cut at a specific angle relative to the incident beam axis, i.e., the optical axis, which is typically the central axis of the crystal, but this is not required. FIGS. 4a–b illustrate a DCAOM according to the invention. The angles corresponding to alpha are exaggerated in all of the figures in order to make them readily visible. The view is of a cross section along the optical axis of the x-y plane of the crystal which is trapezoidal. In the other planes (not shown) the cross section shape is not significant. The four sides of the trapezoid are labeled 12a, 12b, 12c and 12d. The incident face 12a is the face through which the incident beam 16 enters the crystal. In FIG. 4a the acoustic field generated by transducer 13a is illustrated by the dashed lines 41 and the acoustic field generated by transducer 13b is illustrated by the lines 42. The acoustic fields 41 and 42 are formed as relatively flat planes parallel to their respective mounting faces. The size of the transducers should be large enough to ensure that the curvature of the sound field is sufficiently small through the beam cross section to be negligible for the application. FIG. 4b shows the required geometry of the mounting faces by showing that a perpendicular line 43 from the mounting face can be projected to intersect the path of the incident beam 16, i.e., the optical axis, at the angle of 90-alpha. This projected perpendicular line simulates the direction of the propagation of the acoustic field from the mounting face. Note that the angle of intersection with the optical axis is maintained when the axis is translated up or down on the y-axis. This will also be true for translation on the z-axis. Therefore, the optical axis need not be through the center of the crystal, so long as the angular relationship are maintained. To simplify the design of the crystal it is convenient to have the incident beam enter perpendicular to the incident face as shown, but this is not actually required as will be seen later. The transducers 13a and 13b are attached to mounting faces 12b and 12d. The mounting faces intersect the incident face 12a at angle of 90-alpha. The exit face 12c is where the beams emerge. The A1-beam 14a and the B1-beam 14b are diffracted at an angle of plus and minus twice alpha. Therefore, the A1 and B1 beams diverge at an angle of four times alpha. Although the incident beam is shown as entering face 12a, the device will function for a beam entering the opposite face 12c, since the geometry of intersection with the acoustic field is essentially the same although mirror imaged.

Figure 5A:
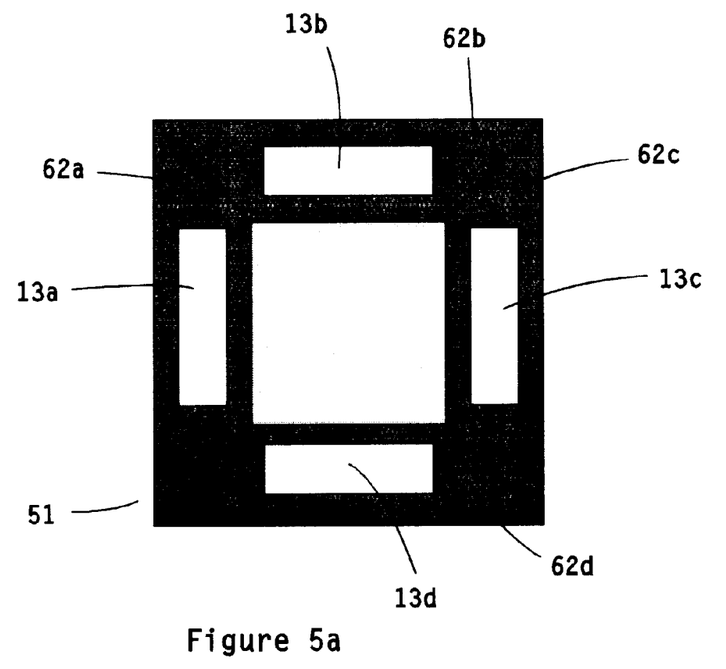
FIGS. 5a–b illustrate a top view and a side view of a four channel AOM assembly according to the invention using a crystal shaped as frustum of a square pyramid.
Figure 5B:
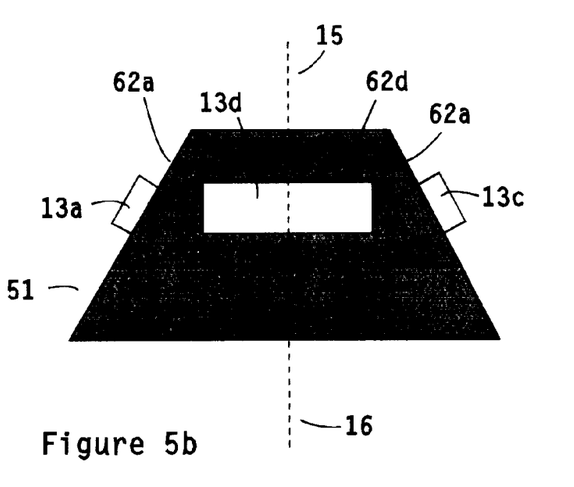

FIG. 5a illustrates a top view of a crystal for use in a four channel AOM according to the invention. The crystal 51 is a frustum of a square pyramid. The four transducers 13a–d are attached to the four mounting faces of the crystal 62a–d which are trapezoidal. The angle of intersection between the trapezoidal faces and the square base and top is a function of the angle alpha similarly to the DCAOM.

Figure 6A:
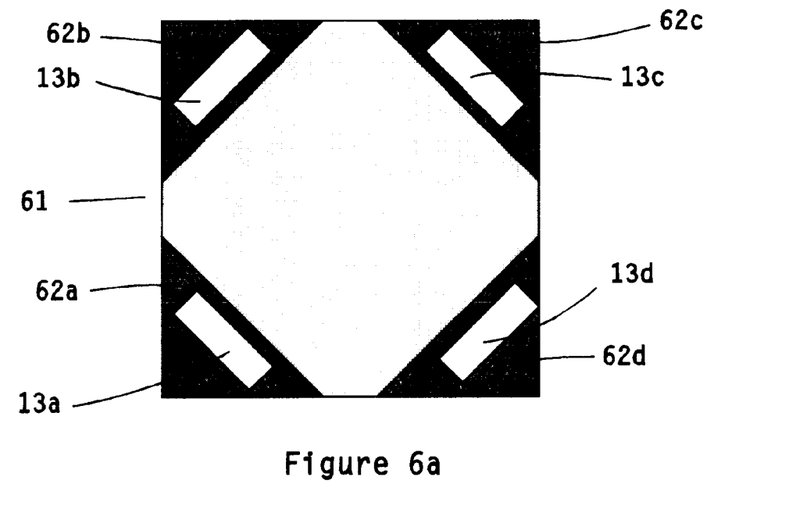
FIGS. 6a–b illustrate a top view and a side view of a four channel AOM assembly according to the invention using a beveled rectilinear crystal.
Figure 6B:
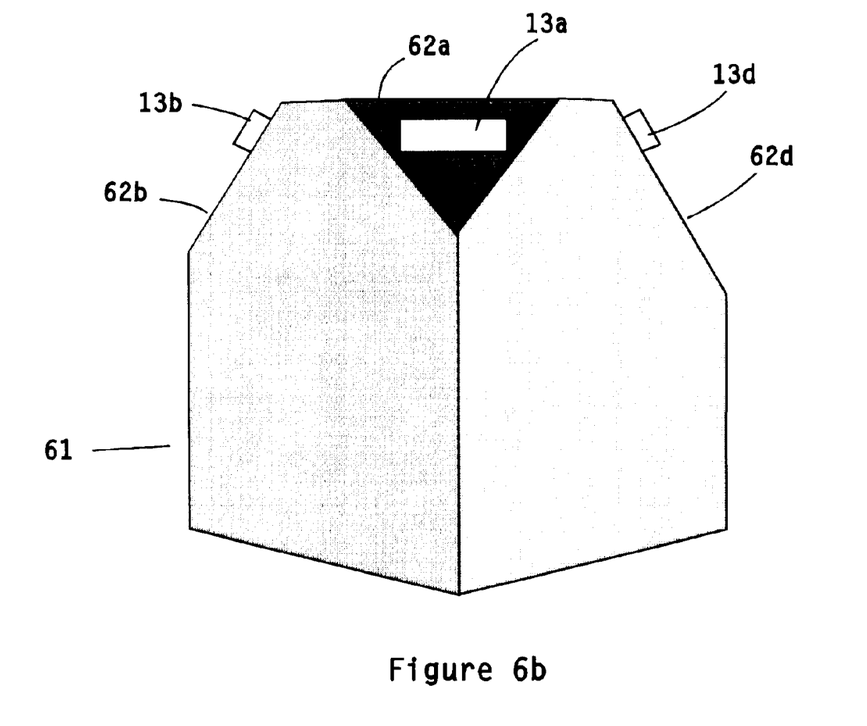
Figure 7A:
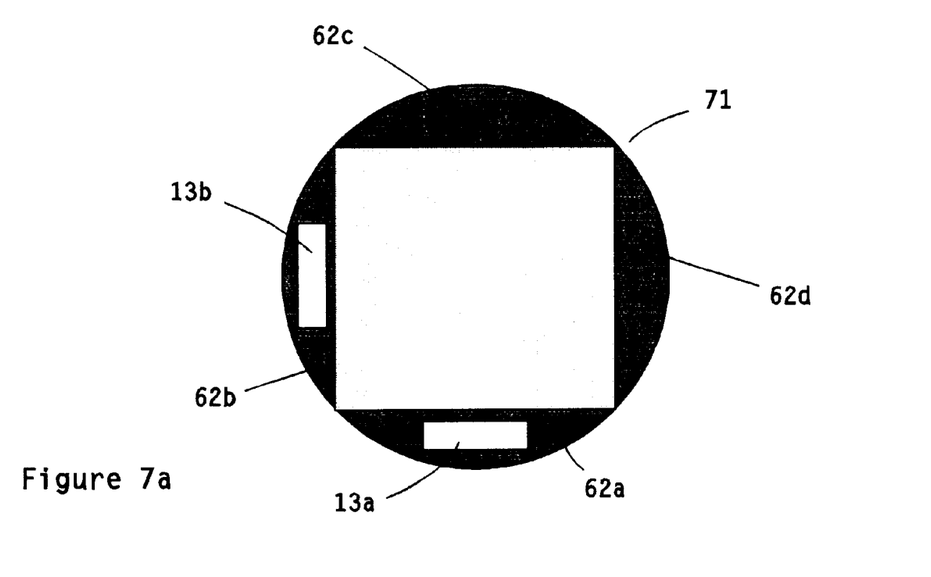
FIGS. 7a–b illustrate a top view and a side view of a two channel AOM assembly according to the invention using a beveled cylindrical crystal.
Figure 7B:
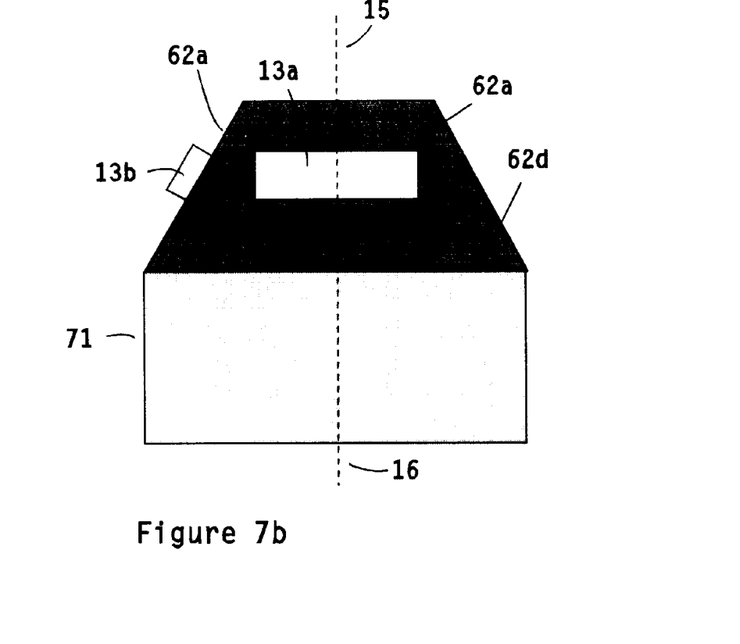

Since the geometric requirements can be met with a frustum of a regular triangular pyramid, a pentagonal pyramid, etc. an MCAOM can be constructed with any number of channels using frusto-pyramidal shapes. Pyramids are also not the only geometric structures for crystals that will work in a MCAOM. For example, the base structure of the crystal can be rectilinear or cylindrical and the faces for the transducers can be cut into the surface or edges to form the mounting faces at the proper angle from the axis. FIG. 6a illustrates a top view of a beveled rectilinear crystal 61 for use in a four channel AOM according to the invention. It can be viewed as essentially a rectilinear crystal with bevels for the mounting faces 62a–d cut into the corners forming triangular mounting surfaces for the transducers 13a–d. When four corners on a square face of the crystal are beveled symmetrically, then acoustic fields generated by transducers on these faces will intersect the incident beam axis at a common angle. FIG. 6b is a perspective side view of the crystal of FIG. 6a. Using the same approach as is illustrated in for a rectilinear crystal, a cylindrical crystal may be used. FIG. 7a is a top view of a faceted cylindrical crystal 71 with mounting faces 62a–d cut into the top. Only two transducers 13a–b are shown on adjacent faces even though there are four mounting faces which can be used. The two transducers may be mounted on opposite faces as well. Likewise three transducers could be used with each one being mounted on any of the three faces. In general, the MCAOM crystals do not have to have a transducer mounted on all of the mounting face for the others to function. Since each transducer functions independently, one or more transducers can be mounted without regard to whether the other faces have transducers. Therefore, for example, it might be convenient to manufacture a standard crystal with a relatively large number of mounting faces, e.g. four, realizing that the crystal would also function as a one, two or three channel device.

Since the requirement is that the mounting faces be cut at a common angle from the axis of the incident beam, the functioning of the crystal is insensitive to other aspects of the shape of the crystal so long as they are not in the optical path and do not induce reflections of the acoustic fields.

Figure 8:
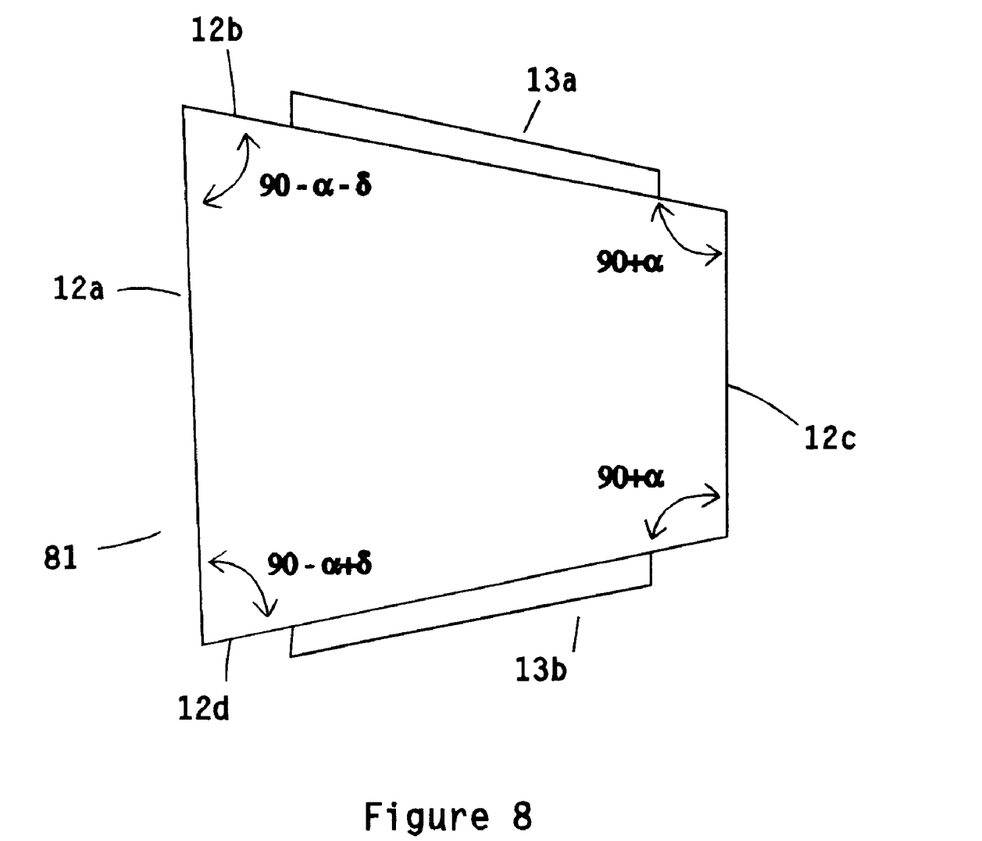
FIG. 8 illustrates a crystal with a slight tilt in the incident face to eliminate normal back-reflection for use in a two channel AOM according to the invention.

Since prior art AOM crystals like that shown in FIG. 3 are used with the incident beam striking the crystal at an angle other than 90 degrees, there is no back reflection of the beam from the crystal into the laser cavity. The MCAOMs are conveniently used with the incident beam entering the crystal perpendicularly as has been illustrated and, therefore, back reflection should at least be considered. The inventors have not observed this problem in practice, but if it were a problem in a particular application, one solution would be to introduce an angle to the incident face of the crystal to remove any possibility of back reflection. A DCAOM modified in this manner is illustrated in FIG. 8. Crystal 81 is similar to crystal 12 in FIG. 4 with the exception that the angles between the incident face 12a and the mounting faces 12b and 12d are not equal as they are in crystal 12. If a small tilt angle $\delta$ of a few degrees is introduced to the incident face then the angles of intersection with the mounting faces are $90-\alpha-\delta$ and $90-\alpha+\delta$. The angles of intersection between the mounting faces and face 12c are $90+\alpha$ and are not affected by the modification and are the same as for crystal 12, i.e., $90+\alpha$. FIG. 4 shows tilting in only one plane, but a tilt in any direction will suffice. The tilting of the incident face may introduce sufficient refraction of the incident beam to require that the angle of the incident beam be adjusted to compensate for effect.

Since the Bragg angle is a function of the acoustic wavelength, it is sometimes useful to modulate the Bragg angle by modulating the wavelength of the driving signal for the transducer. This frequency modulation can be used to sweep the diffracted beam position linearly through a range of angles. Similarly the multiple beams of an MCAOMs can be used with frequency modulated driving signals to sweep the beams. For example, if the DCAOM shown in FIGS. 6a–b were driven with frequency modulated signals the four first order beams would sweep to form an x-y axis. Transducers 13b and 13d on opposite sides would produce tandem beams while the beams for the other pair of transducers 13a, 13c would be at right angles.

While the invention has been particularly shown and described with reference to a preferred embodiment, it will be understood by those skilled in the art that various changes in form and detail may be made therein without departing from the spirit and scope of the invention.

What is claimed is:

1. A laser system comprising:
    a crystal which is transparent for light of a selected wavelength;
    a laser which produces an incident beam of light of the selected wavelength which travels along an axis in the crystal;
    at least first and second acoustic transducers attached to first and second faces respectively of the crystal and oriented symmetrically with respect to the axis so that first and second acoustic fields respectively for the transducers are propagated in distinct directions and intersect the beam symmetrically and at a common angle; and
    first driver means for selectively producing a drive signal for the first transducer to form a first acoustic field in the crystal causing a portion of the incident beam to diffract to form a first order beam A1 along a first path;
    second driver means for selectively producing a drive signal for the second transducer to form a second acoustic field in the crystal causing a portion of the incident beam to diffract to form a first order beam B1 along a second path not coincident with the first path;
    means for directing beam A1 to strike a first position on a substrate; and
    means for directing beam B1 to strike a second position on the substrate;
    whereby, the substrate is locally softened at first and second position, then allowed to solidify to form texture on the substrate.

2. The laser system of claim 1 wherein the first and second drive signals are alternately pulsed.

3. The laser system of claim 2 wherein an amplitude of the first and second acoustic fields is sufficient to create pulses of the beams A1 and B1 each containing more than 50% of the energy of the incident beam.

4. The laser system of claim 2 wherein pulses of the beams A1 and B1 are essentially identical in intensity and time duration.

5. The laser system of claim 1 wherein first driver means further comprises means for modulating an amplitude or frequency of first drive signal.

6. The laser system of claim 1 wherein the first driver means modulates a frequency of the first acoustic field to vary an angle of diffraction of the A1 beam causing the A1 beam to sweep between first and second positions.

7. The laser system of claim 1 further comprising a third acoustic transducer attached to the crystal on a third face and oriented symmetrically with respect to first and second faces and the axis so that a third acoustic field propagated in a third direction intersects the beam symmetrically with respect to first and second acoustic fields and at the common angle causing a portion of the incident beam to diffract to form a first order beam C1 along a third path not coincident with the first or second paths.

8. The laser system of claim 1 wherein the means for directing beam A1 along a first path directs beam A1 to a first side of a substrate and the means for directing beam B1 along a second path directs beam B1 to a second side of a substrate.

9. The laser system of claim 8 further comprising means for rotating the substrate to form texture in a circular or spiral pattern.

10. The laser system of claim 9 wherein the texture comprises bumps on the substrate.

11. A method of operating a laser system comprising the steps of:
    generating an incident beam of laser light along an axis in a crystal;
    driving a first acoustic transducer attached to the crystal on a first face to create a first acoustic field in the crystal which intersects the incident beam at a selected angle which causes a portion of the incident beam to diffract to form a first order beam A1;
    directing beam A1 along a first path to strike a first position on a substrate causing a spot on the surface of the substrate to soften, then removing the beam to allow the spot to solidify into a texture feature;
    driving a second acoustic transducer attached to the crystal on a second face which is symmetrical to the first face with respect to the axis to create a second acoustic field in the crystal, different from the first axis, which intersects the incident beam at the selected angle which causes a portion of the incident beam to diffract to form a first order beam B1 not coincident with beam A1; and
    directing beam B1 along a second path to strike a second position on the substrate causing a spot on the surface of the substrate to soften, then removing the beam to allow the spot to solidify into a texture feature.

12. The method of claim 11 wherein beams A1 and B1 are alternately pulsed.

13. The method of claim 12 wherein an amplitude of the first and second acoustic fields is selected to create pulses of the beams A1 and B1 containing more than 50% of the energy of the incident beam.

14. The method of claim 12 wherein pulses of the beams A1 and B1 are essentially identical in intensity and time duration.

15. The method of claim 11 wherein the step of driving a first acoustic transducer comprises modulating an amplitude or frequency of an acoustic field.

16. The method of claim 11 wherein the step of driving a first acoustic transducer comprises modulating a frequency of the acoustic field to vary an angle of diffraction of the A1 beam causing the A1 beam to sweep between first and second positions.

17. The method of claim 11 wherein the step of directing beam A1 along a first path directs beam A1 to a first side of the substrate and the step of directing beam B1 along a second path directs beam B1 to a second side of the substrate.

18. The method of claim 17 further comprising means for rotating the substrate to form texture in a circular or spiral pattern.

19. A laser system comprising:
    a crystal;
    a laser which generates an incident beam in the crystal along an axis;
    at least first and second acoustic transducers attached to first and second faces of the crystal and oriented symmetrically with respect to the axis so that first and second acoustic fields generated by the acoustic transducers are propagated in first and second directions and intersect the incident beam symmetrically and at a common angle and cause a portion of the incident beam to diffract into beam A1 by the first acoustic field and beam B1 by the second acoustic field with beams A1 and B1 not being coincident;
    a first pulse generator connected to the first acoustic transducer to form pulses of beam A1;
    a second pulse generator connected to the second acoustic transducer to form pulses of beam B1;

an oscillator which alternately triggers first and second pulse generators to generate alternate pulses of beams A1 and B1;

means for directing pulses of beam A1 to a first side of a substrate;

means for directing pulses of beam B1 to a second side of the substrate; and means for rotating the substrate.

20. The system of claim 19 wherein the pulses of beams A1 and B1 cause softening of spots on a surface of the substrate.

* * * * *